United States Patent
Bayne et al.

(10) Patent No.: US 7,116,079 B2
(45) Date of Patent: Oct. 3, 2006

(54) METHODS AND APPARATUS FOR SIMULTANEOUSLY CHARGING MULTIPLE RECHARGABLE BATTERIES

(75) Inventors: Ryan Mitchell Bayne, Waterloo (CA); Michael L. Purdy, Cambridge (CA)

(73) Assignee: Research in Motion Limited, Waterloo (CA)

( * ) Notice: Subject to any disclaimer, the term of this patent is extended or adjusted under 35 U.S.C. 154(b) by 246 days.

(21) Appl. No.: 10/787,314

(22) Filed: Feb. 27, 2004

(65) Prior Publication Data

US 2005/0189921 A1    Sep. 1, 2005

(51) Int. Cl.
*H02J 7/00*    (2006.01)
(52) U.S. Cl. ....................................... 320/116
(58) Field of Classification Search ................ 320/116, 320/118, 119, 114, 124, 125; 713/300
See application file for complete search history.

(56) References Cited

U.S. PATENT DOCUMENTS

| | | | | |
|---|---|---|---|---|
| 5,717,309 A | * | 2/1998 | Cho | 320/125 |
| 5,903,764 A | * | 5/1999 | Shyr et al. | 713/300 |
| 6,002,237 A | | 12/1999 | Gaza | 320/116 |
| 6,005,368 A | * | 12/1999 | Frame | 320/113 |
| 6,081,096 A | * | 6/2000 | Barkat et al. | 320/124 |
| 6,160,378 A | * | 12/2000 | Helot et al. | 320/119 |
| 6,204,632 B1 | * | 3/2001 | Nierescher et al. | 320/116 |
| 6,424,119 B1 | * | 7/2002 | Nelson et al. | 320/116 |
| 6,445,159 B1 | * | 9/2002 | Ramsden | 320/119 |
| 6,534,953 B1 | * | 3/2003 | Shirakawa | 320/114 |
| 6,650,089 B1 | | 11/2003 | Freeman et al. | 320/132 |

FOREIGN PATENT DOCUMENTS

| | | | |
|---|---|---|---|
| DE | 4200693 | * | 5/1993 |
| EP | 1124300 | | 8/2001 |

OTHER PUBLICATIONS

Smart Battery Data Specification @ http://www.sbs-forum.org/specs/errata_sbdat110a.pdf, Revision 1.1, Dec. 1998.*
European Examiner's Report, European Application No. 04 2251 147.7-2207, Nov. 7, 2005.

* cited by examiner

*Primary Examiner*—Pia Tibbits
(74) *Attorney, Agent, or Firm*—Bereskin & Parr

(57) ABSTRACT

A charger has two or more separate charging ports to which two or more rechargeable batteries can be coupled, respectively. Current from a single current source is allocated to the two or more separate charging ports so that the two or more rechargeable batteries will be fully charged at substantially the same time.

11 Claims, 4 Drawing Sheets

METHODS AND APPARATUS FOR SIMULTANEOUSLY CHARGING MULTIPLE RECHARGABLE BATTERIES

FIELD OF THE INVENTION

The invention relates generally to chargers for rechargeable batteries of mobile electronic devices. In particular, embodiments of the invention relate to a method for simultaneously charging the battery inside a mobile electronic device and a second battery for the mobile electronic device.

BACKGROUND OF THE INVENTION

Many users of mobile electronic devices have a second battery on hand for use when the battery in the mobile electronic device is discharged. After discharging both batteries, a user will want to recharge the two batteries as quickly as possible.

Current options include the following:
a) Fully charging one battery using the charging circuitry in the mobile electronic device and an external power adapter, then exchanging the two batteries to charge the second battery.
b) Charging one battery using the charging circuitry in the mobile electronic device and an external power adapter, and simultaneously charging the second battery in an external battery charger;
c) Charging one battery using the charging circuitry in the mobile electronic device connected to a dual-output external battery charger, with the second battery connected to the other output of the external battery charger. The external battery charger charges the batteries in sequential order without user intervention, or trickle charges one of the batteries while charging the other battery at full rate until it is fully charged, or gives one battery priority and provides all available current to that battery and any remaining current that can be supplied to the charger is provided to the secondary battery.

These options either extend the charge time by charging the batteries in sequential order, by keeping one battery in slow-rate trickle charge until it is fully charged, or require the user to carry two separate charging accessories with them.

SUMMARY OF THE INVENTION

In some embodiments of the invention, charging currents from a single current source may be allocated to two or more separate charging ports having two or more rechargeable batteries coupled respectively thereto so that the two or more rechargeable batteries will be fully charged at substantially the same time. Relative amounts of charge required to fully charge the two or more rechargeable batteries may be determined. A charging current allocated to a particular charging port may be determined at least in part on an average current drain during usage of the rechargeable battery coupled to the particular charging port.

In some embodiments of the invention, a charger has a single current source and two or more separate charging ports. The charger includes a current allocator to allocate charging currents from the single current source to the two or more charging ports. The charger also includes a controller to determine the charging currents so that two or more rechargeable batteries coupled respectively to the two or more charging ports will be fully charged at substantially the same time.

The charger may include one or more lookup tables and a measurement unit to measure voltage differences at the two or more charging ports. The controller may determine from the one or more lookup tables an amount of charge required to fully charge a battery based on the measured voltage difference, a battery type, and an average current drain of the battery during usage.

A particular one of the rechargeable batteries may be inside a battery-operated device. The controller may receive a voltage of the particular rechargeable battery from the battery-operated device. The charger may include one or more look up tables, and the controller may determine from the one or more lookup tables an amount of charge required to fully charge a battery based on the received voltage, a battery type, and an average current drain of the battery during usage.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the invention.

Figure 1:
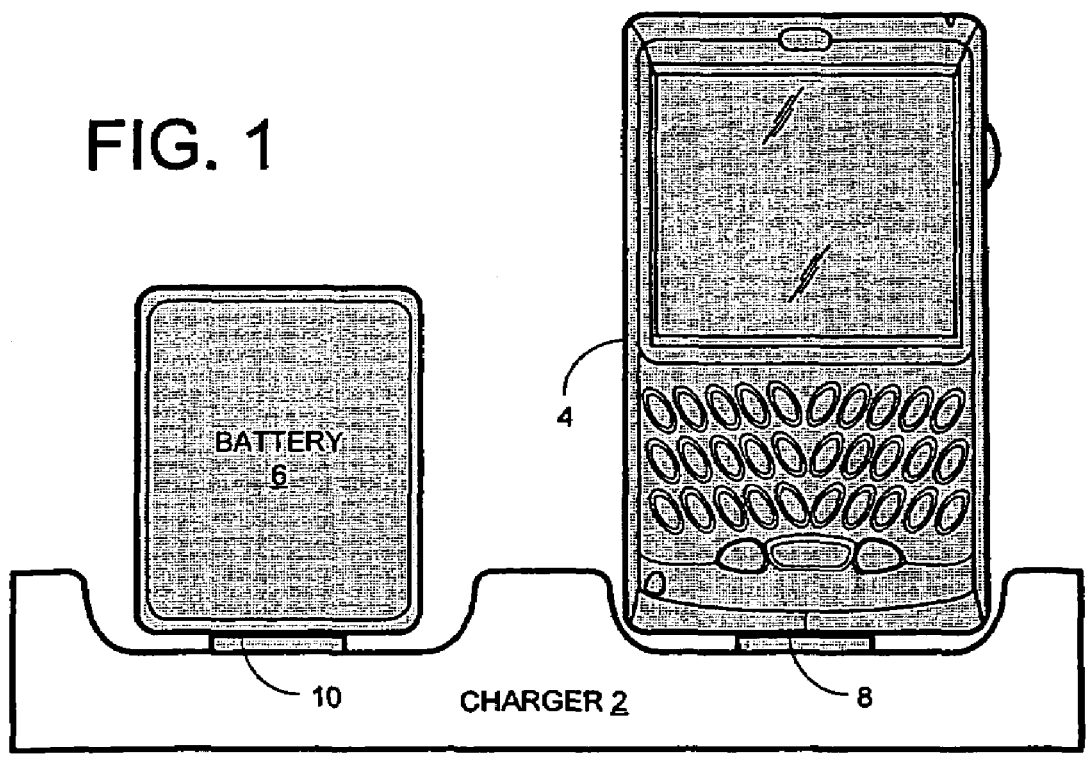
FIG. 1 is simplified front view of a charger, a battery-operated device and a battery, in accordance with some embodiments of the invention.

Reference is made to FIG. 1, which is simplified front view of a charger 2, a battery-operated device 4 and a battery 6, in accordance with some embodiments of the invention. Charger 2 may have, for example, two charging ports 8 and 10. Battery-operated device 4 is coupled to charging port 8 and battery 6 is coupled to charging port 10.

Charger 2 may be capable of simultaneously charging the battery of battery-operated device 4 and battery 6. In some embodiments of the invention, charger 2 may have more than two charging ports, and may therefore be capable of simultaneously charging more than two batteries. For example, a charger according to some embodiments of the invention may have five charging ports, and may be capable of simultaneously charging one, two, three, four or five batteries.

Figure 2:
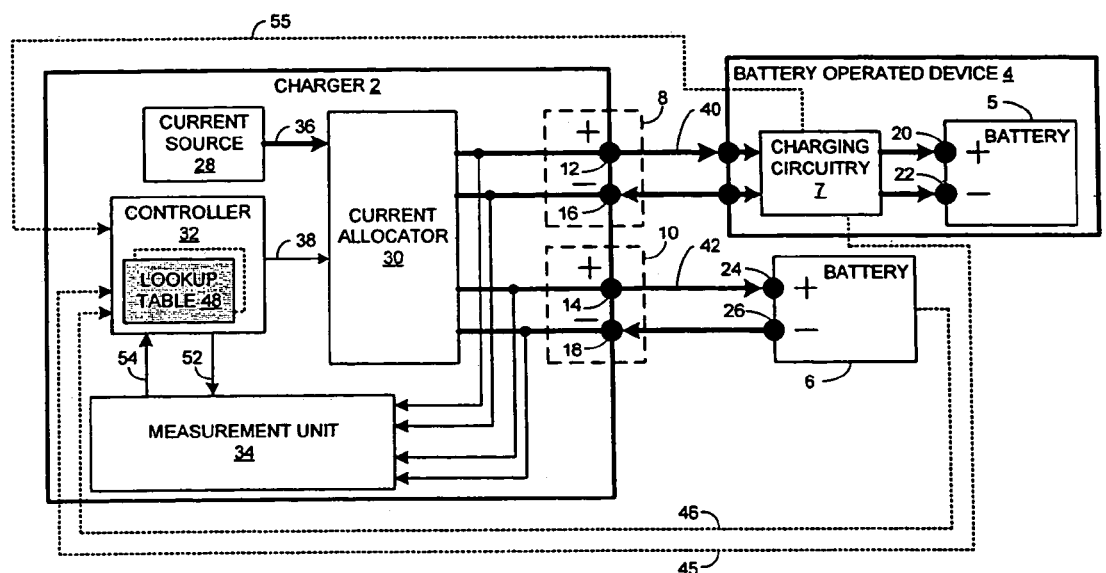
FIG. 2 is a simplified block diagram of a charger, a battery-operated device and a battery, in accordance with some embodiments of the invention.

Reference is now made to FIG. 2, which is a simplified block diagram of charger 2, battery-operated device 4 and battery 6, in accordance with some embodiments of the invention. Battery-operated device 4 may include a battery 5 and charging circuitry 7. Charger 2 may have, for example, two charging ports 8 and 10, having respective positive terminals 12 and 14, and respective negative terminals 16 and 18.

For charger 2 to charge battery 5, a positive terminal 20 of battery 5 may be coupled to positive terminal 12 of charging port 8 via charging circuitry 7 and a negative terminal 22 of battery 5 may be coupled to negative terminal 16 of charging port 8 via charging circuitry 7. Similarly, for charger 2 to charge battery 6, a positive terminal 24 of battery 6 may be coupled to positive terminal 14 of charging port 10 and a negative terminal 26 of battery 6 may be coupled to negative terminal 18 of charging port 10.

Figure 3:
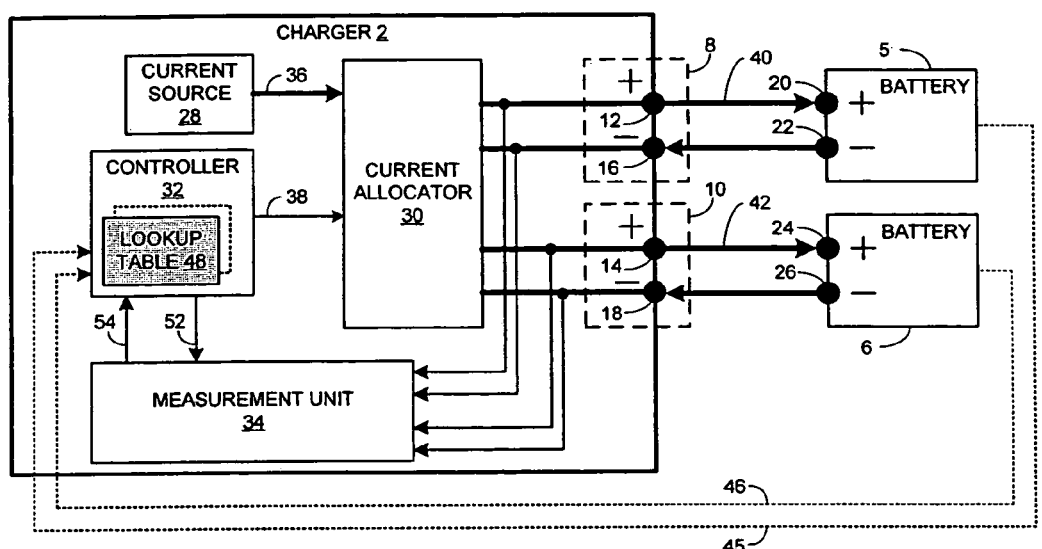
FIG. 3 is a simplified block diagram of a charger and two batteries, in accordance with some embodiments of the invention.

Reference is made additionally to FIG. 3, which is a simplified block diagram of charger 2 and batteries 5 and 6 to be charged, in accordance with some embodiments of the invention. Many of the elements in FIG. 3 are the same as or similar to elements of FIG. 2, and therefore the following description applies equally to FIG. 2 and FIG. 3.

Charger 2 may include a current source 28, a current allocator 30, a controller 32 and a measurement unit 34. Current source 28 may be capable of providing a current 36 of, for example, 500 milliamps (mA). Current allocator 30 may receive current 36, and may be capable of allocating a current portion 40 of current 36 to charging port 8 and a current portion 42 of current 36 to charging port 10. For example, current portion 40 may be 140 mA and current portion 42 may be 360 mA.

The allocation proportions of current 36 to current portions 40 and 42 may be controllable, at least in part, by controller 32 via control signals 38.

According to some embodiments of the invention, controller 32 may optionally receive battery type identifications 45 and 46 from batteries 5 and 6, respectively. (In the case of battery 5 coupled to the charging port via battery-operated device 4, as shown in FIG. 2, charging circuitry 7 may obtain the battery type identification from battery 5 and pass the information onwards to controller 32.) Controller 32 may comprise one or more look up tables 48 containing information regarding one or more types of batteries. Such information may include, for example, the maximum charge capacity, the average current drain from the battery during usage, and the estimated relationship between the output voltage of the battery and the unused capacity of the battery.

According to other embodiments of the invention, the type of batteries 5 and 6, and optionally the average current drain from batteries 5 and 6 during usage may be known in advance. For example, mechanical constraints may mean that only one type of battery can be coupled to charging port 8 or to charging port 10.

Measurement unit 34 may be capable of measuring the voltage difference between positive terminal 12 and negative terminal 16, and may be capable of measuring the voltage difference between positive terminal 14 and negative terminal 18.

Measurement unit 34 may be controlled, at least in part, by controller 32. Controller 32 may command measurement unit 34 via signals 52 to measure the voltage difference between positive terminal 12 and negative terminal 16, and may receive the measurement result from measurement unit 34 via signals 54. In addition, controller 32 may command measurement unit 34 via signals 52 to measure the voltage difference between positive terminal 14 and negative terminal 18, and may receive the measurement result from measurement unit 34 via signals 54.

In some situations where battery 5 is included in battery-operated device 4, and battery-operated device 4 is coupled to charging port 8, the voltage difference between positive terminal 12 and negative terminal 16 may not represent the voltage of battery 5. In such situations, battery-operated device 4 may report the actual voltage of battery 5 to controller 32 via a data path 55.

Controller 32 may use look-up table 48 to determine the charge in the battery coupled to the charging port from the measurement of the voltage difference and the average current drain from the battery during usage.

Figure 4:
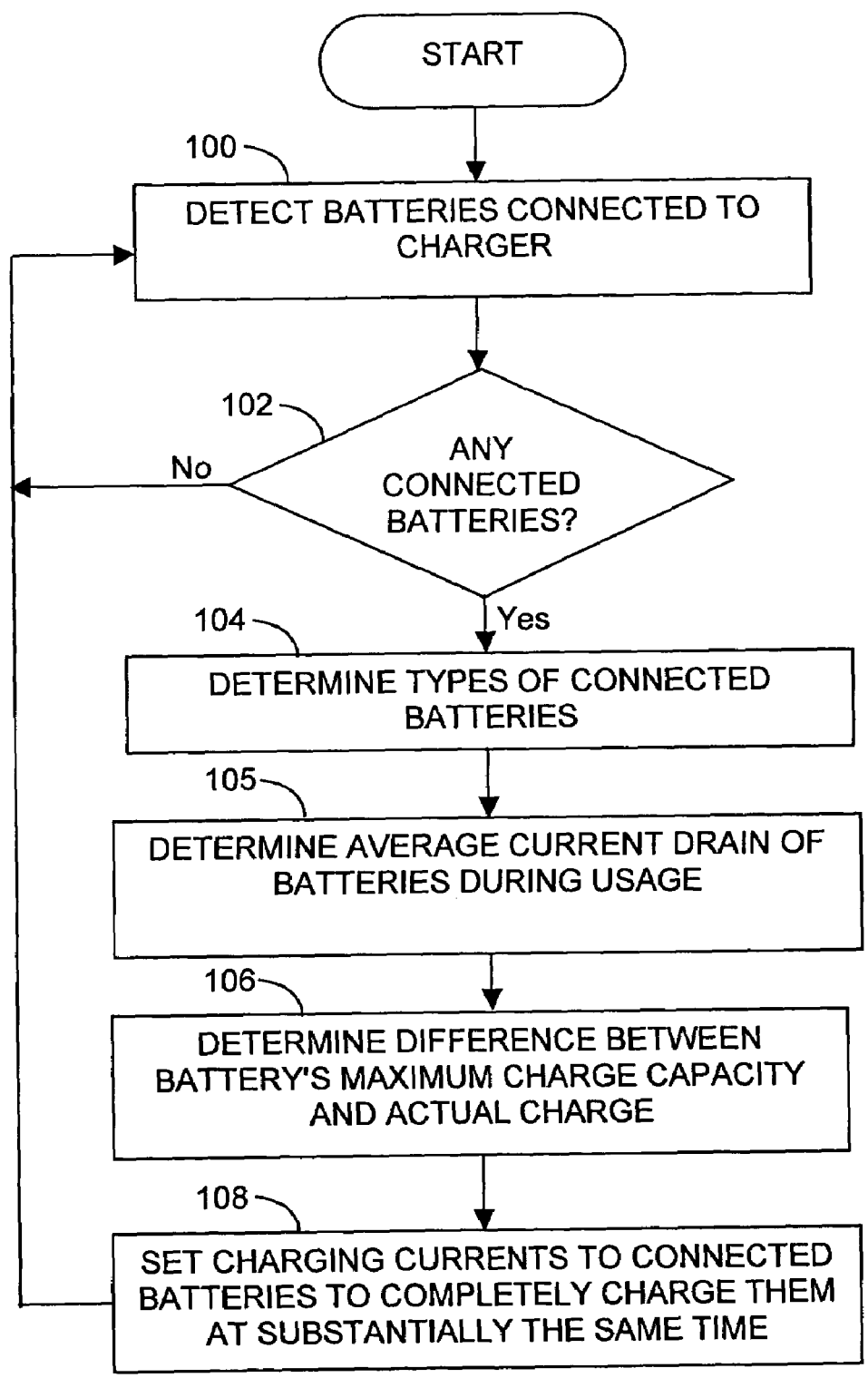
FIG. 4 is a flowchart of an exemplary method for simultaneously charging multiple rechargeable batteries, according to some embodiments of the invention.

FIG. 4 is a flowchart of an exemplary method for simultaneously charging multiple rechargeable batteries, according to some embodiments of the invention. The exemplary method of FIG. 4 may be executed by controller 32, although the invention is not limited in this respect.

Controller 32 may check whether any batteries are coupled to charging ports 8 and 10 (100). If no battery is coupled to charging ports 8 and 10 (102), the method may continue to block 100. However, if at least one battery is coupled (to either charging port 8, charging port 10, or to both), controller 32 may determine the types of the coupled batteries (104). The difference between the maximum charge capacity and the charge in the battery is determined for each of the coupled batteries (106). For example, this difference is determined by measuring the battery's voltage and obtaining the corresponding information from look up tables 48 for the average current drain from the battery during usage (105).

The charging current for each of the coupled batteries is set (e.g., current portions 40 and 42) so that all coupled batteries may become fully charged at substantially the same time (108).

From time to time, the method may repeat from block 100 in order to detect changes in the number and type of coupled batteries, and to adjust the charging currents accordingly, and to adjust the charging currents according to the progress of the charging process.

The following table lists an example where battery 5 is charged to 60% of its maximum capacity and battery 6 is charged to 40% of its maximum capacity.

TABLE 1

|  | Battery 5 | Battery 6 |
|---|---|---|
| maximum capacity | 600 mAh | 1000 mAh |
| charge in battery | 360 mAh | 400 mAh |
| amount of charge required to fully charge battery | 240 mAh | 600 mAh |
| time required to fully charge battery | 240 mAh/ (current portion 40) | 600 mAh/ (current portion 42) |

In the example given in FIG. 1, the total available current (current 36) is 500 mA. Therefore, the sum of current portion 40 and current portion 42 may not exceed 500 mA.

In order for both battery 5 and battery 6 to be fully charged at substantially the same time, current allocator 30 will allocate current portion 40 to battery 5 and current portion 42 to battery 6 according to the following calculation:

$$240 mAh * (current\ portion\ 42) = 600 mAh * (current\ portion\ 40)$$

$$240 mAh * (500 - current\ portion\ 40) = 600 mAh * (current\ portion\ 40)$$

current portion 40=142 mA current portion 42=358 mA

Since the charge profile of rechargeable batteries is not linear in nature, controller 32 may recheck the charge of the batteries from time to time so that current allocator 30 can readjust the charge allocation accordingly.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method of charging two or more rechargeable batteries from a single current source by use of two or more separate charging ports, the batteries being coupled to different respective charging ports, the method comprising:
   determining a charging current to be allocated to each charging port at least in part on an average current drain during usage of the rechargeable battery coupled to the respective charging port; and
   allocating charging currents from the single current source to the two or more separate charging ports so that said two or more rechargeable batteries will be fully charged at substantially the same time.

2. The method of claim 1, further comprising:
   determining relative amounts of charge required to fully charge said two or more rechargeable batteries.

3. A charger comprising:
   a single current source;
   two or more separate charging ports;
   a current allocator to allocate charging currents from said single current source to said two or more ports;
   a controller to determine said charging currents so that two or more rechargeable batteries coupled respectively to said two or more ports will be fully charged at substantially the same time; and
   one or more lookup tables, wherein the controller is configured to determine from the one or more lookup tables an amount of charge required to fully charge each battery based on measured voltage differences at the two or more ports, a battery type of the respective battery and an average current drain of each battery during usage.

4. The charger of claim 3, further comprising:
   a measurement unit to measure voltage differences at said two or more ports.

5. The charger of claim 3, wherein a particular one of said rechargeable batteries is inside a battery-operated device and said controller is to receive a voltage of said particular rechargeable battery from said battery-operated device.

6. The charger of claim 3, further comprising a measurement unit to measure voltage differences at said two or more ports for use in determining said charging currents.

7. The charger of claim 3, wherein a particular one of the rechargeable batteries is, in use of the charger, inside a battery-operated device and the controller is configured to receive a voltage of the particular rechargeable battery from the battery-operated device for use in determining an amount of charge required to fully charge the particular battery.

8. The method of claim 2, wherein the steps of determining and allocating are repeated during charging of the batteries.

9. The method of claim 2, wherein the charging currents are allocated in proportion to the determined amounts of charge.

10. The method of claim 1, wherein the batteries are for a mobile electronic device.

11. The charger of claim 3, wherein the batteries are for a mobile electronic device.

* * * * *